(12) United States Patent
Monaci et al.

(10) Patent No.: US 8,947,255 B2
(45) Date of Patent: Feb. 3, 2015

(54) METHOD AND APPARATUS FOR GENERATING A PREDETERMINED TYPE OF AMBIENT LIGHTING

(75) Inventors: Gianluca Monaci, Eindhoven (NL); Tommaso Gritti, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 83 days.

(21) Appl. No.: 13/704,111

(22) PCT Filed: Jun. 22, 2011

(86) PCT No.: PCT/IB2011/052733
§ 371 (c)(1),
(2), (4) Date: Dec. 13, 2012

(87) PCT Pub. No.: WO2012/001588
PCT Pub. Date: Jan. 5, 2012

(65) Prior Publication Data
US 2013/0088359 A1 Apr. 11, 2013

(30) Foreign Application Priority Data
Jun. 28, 2010 (EP) .................................. 10167446

(51) Int. Cl.
*G08B 5/36* (2006.01)
*H05B 37/02* (2006.01)

(52) U.S. Cl.
USPC .................. 340/691.8; 340/691.1; 340/691.4; 315/241 P

(58) Field of Classification Search
USPC ........ 340/691.1, 691.4, 691.8, 815.4, 815.43, 340/815.45, 815.65, 815.66, 815.67, 340/815.74, 815.75, 439; 315/241 P, 291, 315/294, 299, 307, 308; 362/3, 4, 244, 362/249.06; 250/221
See application file for complete search history.

(56) References Cited

U.S. PATENT DOCUMENTS

| | | | |
|---|---|---|---|
| 5,406,073 A * | 4/1995 | Sharp et al. | 250/221 |
| 7,248,002 B2 * | 7/2007 | Yamamoto et al. | 315/308 |
| 7,495,548 B2 | 2/2009 | Yabashi et al. | |
| 7,517,091 B2 * | 4/2009 | Lippey et al. | 353/84 |
| 7,683,755 B2 | 3/2010 | Ostrovsky et al. | |
| 8,415,897 B2 * | 4/2013 | Choong et al. | 315/294 |
| 8,598,798 B2 * | 12/2013 | Bergquist | 315/241 P |
| 2006/0016898 A1 | 1/2006 | Ashworth | |
| 2012/0281879 A1 | 11/2012 | Vlutters et al. | |

FOREIGN PATENT DOCUMENTS

| | | |
|---|---|---|
| EP | 1168288 A2 | 1/2002 |
| WO | 2004049767 A1 | 6/2004 |
| WO | 2007052197 A1 | 5/2007 |

(Continued)

OTHER PUBLICATIONS

Mahler et al: "Mobile Device Interaction in Ubiquitous Computing"; Chapter 19, pp. 311-330, from the book, "Advances in Human-Computer Interaction", Shane Pinder Editor, ISBN 978-953-7619-15-2, Published Oct. 2008.

*Primary Examiner* — Van T. Trieu

(57) ABSTRACT

A predetermined type of ambient lighting is generated in which the influence of each of a plurality of luminaries on a predetermined type of ambient lighting is determined (203) and illumination of each of the plurality of luminaries is controlled (209) to generate said predetermined type of ambient light based on the determined influence of each of the plurality o f luminaries.

15 Claims, 3 Drawing Sheets

(56) References Cited

FOREIGN PATENT DOCUMENTS

| WO | 2007072285 | A1 | 6/2007 |
| WO | 2007110791 | A1 | 10/2007 |
| WO | 2008104927 | A2 | 9/2008 |
| WO | 2008139360 | A1 | 11/2008 |
| WO | 2009010926 | A1 | 1/2009 |
| WO | 2010108326 | A1 | 9/2010 |
| WO | 2011086501 | A1 | 7/2011 |

* cited by examiner

METHOD AND APPARATUS FOR GENERATING A PREDETERMINED TYPE OF AMBIENT LIGHTING

FIELD OF THE INVENTION

The present invention relates to a method and apparatus for generating a predetermined type of ambient lighting. In particular, but not exclusively, it relates to a method and apparatus for indicating an operational status of a device via use of ambient lighting.

BACKGROUND TO THE INVENTION

Recently lighting systems have been transformed. This has been possible due to the increased use of individually controlled single lights with advanced rendering capabilities such as LED luminaries that have been becoming increasingly affordable and effective. As a result of which, there has been an increasing demand for more complex lighting systems which invariably involve computer controls.

An example of a known computer-controlled lighting system is disclosed by WO 2008/104927. The approach described in WO 2008/104927 aims to automatically render a pattern of light on a working surface by localizing the point of maximum intensity of each light on the surface, work points, and to compute system (linear or non-linear) equations to minimize the error between the colours rendered at the work points and the corresponding points in a desired light pattern.

However, using such a computer-controlled system for the setting of ambient lighting is cumbersome. It requires knowledge of a series of parameters for each light, such as the angle of incidence to the surface and the distance from the surface. Further, the illumination effects are created on a work surface. An extension from a single surface to an area such as a room or an outside area is not trivial. This is because the method in WO 2008/104927 samples few points of the work surface used to obtain the optimal solution. Since only one point per light is sampled, the effect of the considered light on the surrounding scene is completely neglected. The main assumption is thus that the scene is modelled as a completely uniform surface, with an absence of objects and with a uniform colour.

As a result complex ambient lighting schemes cannot be developed using such existing systems. Furthermore these existing lighting systems provide no intuitive control and are incapable of fully exploiting the rendering capabilities of the complete lighting system.

Further, there has been a clear trend towards increasing the amount of technology in the home. As smart devices proliferate and become universally networked, users experience an increase in both the number of the devices they can control and the available interaction modalities for controlling them. One major trend in interacting with technology is to interact with a device from a distance, from anywhere in a room, without any additional device such as a remote control for example, i.e. ubiquitous device-less interaction. An example of ubiquitous device-less interaction is using speech commands to control a device at a distance from the device and get feedback on its operating status, without actually having to walk to the device or fetch the remote control.

Although there exist many products that provide input commands to a device from a distance without a remote control, for example using speech recognition technologies, there is no existing solution which provides continuous feedback of the operating status of a device anywhere in a room.

Typically, electronic devices provide feedback about their operating status using LEDs or displays on the devices themselves. This obviously relies on the user being able to see the device and read the local display, which is not always possible or desirable. One solution is the use of projecting the status display onto a wall near the user but this is cumbersome, cannot be viewed from anywhere and not suitable for outdoor areas.

Another solution is the use of sound. One trivial example is the oven beeping when a time is reached on its timer. Another is use of speech such as used in car navigation systems or in the later generations of iPod Shuffle. However, the disadvantages of using sound are that sound cannot be used continuously to show the operating status of a device, it can only be used to indicate a special event. In the example above, the beep indicating that a time has been reached is acceptable, but a voice continuously saying "The oven temperature is 170 degrees and it is increasing" would be annoying. Further, simple sounds cannot provide enough information about complex, diverse functionalities of modern home appliances.

Speech can convey richer feedback than simple sounds, but for many applications synthesized speech is perceived as unnatural and of little practical use.

Use of lighting, for example, changing illumination to indicate a change in status of a device is known as disclosed, for example, by EP 1168288.

SUMMARY OF INVENTION

The present invention seeks to provide a lighting system which is intuitive and yet exploits all the rendering capabilities of a complex system and also seeks to provide improved feedback of the operating status of devices which is continuous, informative and pleasant.

This is achieved, according to one aspect of the present invention, by a method of generating a predetermined type of ambient lighting comprising the steps of: determining the influence of each of a plurality of luminaries on a predetermined type of ambient lighting; and controlling illumination of each of the plurality of luminaries to generate the predetermined type of ambient light based on the determined influence of each of the plurality of luminaries.

This is also achieved, according to a second aspect of the present invention, by apparatus for generating a predetermined type of ambient lighting, the apparatus comprising: a processor for determining the influence of each of a plurality of luminaries on a predetermined type of ambient lighting and controlling illumination of each of the plurality of luminaries to generate said predetermined type of ambient light based on the determined influence of each of the plurality of luminaries.

In this way, a lighting scheme is automatically generated which more fully exploits the rendering capabilities arbitrarily complex lighting systems without demanding complex user interaction in that the influences of the luminaries is determined automatically. As a result, in order for the user to obtain an atmosphere, the user merely selects any desired predetermined type of ambient lighting.

In an embodiment, the step of determining the influence of each of the plurality of luminaries comprises the step of: determining the influence of each of the plurality of luminaries on each of a plurality of predetermined types of ambient lighting.

As a result more complex lighting scheme can easily be implemented, providing more options.

In an embodiment, the step of determining the influence of each of the plurality of luminaries on each of a plurality of predetermined types of ambient lighting comprises the step of: acquisitioning a plurality of illumination modes; and associating each of the plurality of acquisitioned illumination modes with each of the plurality of predetermined types of ambient lighting. The step of controlling illumination of each of the plurality of luminaries to generate said predetermined type of ambient light may comprise the step of: selecting the acquisitioned illumination mode associated with the required predetermined type of ambient lighting; and illuminating the plurality of luminaries according to the selected acquisitioned illumination mode.

The settings for controlling illumination of the luminaries can easily be derived, making the system easy and quick to set up. Further the acquisition can be utilised to provide the user with representation of the predetermined type of ambient lighting in an input mode which gives an immediate and intuitive representation of a lighting atmosphere and allows the user to translate into a light atmosphere any visual content.

In an alternative embodiment, the step of determining the influence of each of a plurality of luminaries comprises the steps of: determining a plurality of influencing factors; and determining the influence based upon at least one of the plurality of determined influencing factors. The influencing factors may comprise any one of location of each luminary, colour output of each luminary, position of objects, shadows, and size of room, other ambient lighting, and location of user or a combination thereof.

This automatically sets illumination effects in any type of room or outdoor area without limitation to presence of furniture, shadows or ambient illumination.

Furthermore, luminaries can be placed anywhere and their influence on the scene is automatically taken into account. While in previous methods shadows and furniture represent a problem, the present invention exploits them to obtain the optimal solution.

In determining influencing factors such as location of each luminary, colour output of each luminary, position of objects, shadows, size of room, other ambient lighting, and location of user etc, the settings can be easily adapted to compensate for any changes in the influencing factors.

In addition, the step of controlling illumination of each of the plurality of luminaries may comprise the step of: controlling at least one of the colour intensity output of each luminary, brightness level of each luminary, direction of illumination of each luminary, timing of illumination of each luminary.

The method may further comprise the step of mapping at least one operational status of a device to at least one of the plurality of predetermined types of ambient light.

The system allows the visualization in a room in real-time of the operating status of any device using a controllable lighting system or part of it. In this way, a user is aware of the status of a device even if he/she cannot see the device's display or is not attending to it, without the need of expensive large displays or projection systems or annoying sounds.

In an embodiment the effect of several (possibly coloured) controllable lights may be combined to convey enough information to feedback the essential operating functions of most modern appliances. For example, if enough controllable coloured lights are present the system can provide full feedback of a media player status and support the navigation through a music playlist.

In an embodiment, the step of determining the influence of each of the plurality of luminaries comprises the step of: determining the influence of each of the plurality of luminaries for each of a plurality of predetermined types of ambient lighting and at least one operational status may be mapped to at least one of the plurality of predetermined types of ambient light.

One embodiment of the system can adapt the complexity of the feedback information to the complexity of the lighting installation, as the system is aware of the lighting system capabilities, for example, the combinations of the plurality of predetermined types of ambient lighting may be determined based on the lighting system capabilities (the number of luminaries, location, colour etc) and the mapping may be adapted accordingly.

One embodiment of the system automatically selects the lights to use and their effect to provide maximally pleasant and informative feedback depending on the position of the user in the room.

The visual feedback may not be continuous, but it can be activated upon user request.

According to yet another aspect of the present invention, there is provided a method of indicating the operational status of a device comprising the steps of: determining the number of operational status conditions of a device; determining the number of predetermined types of ambient lighting of a plurality of luminaries ; generating a mapping of the operational status conditions and the predetermined types of ambient lighting based upon the determined number of operational status conditions of the device and the determined number of predetermined types of ambient lighting; and generating a predetermined type of ambient lighting according to the generated mapping to indicate the current operational status of the device.

According to yet another aspect of the present invention, there is provided apparatus for indicating the operational status of a device comprising: a processor for determining the number of operational status conditions of a device, determining the number of predetermined types of ambient lighting of a plurality of luminaries, generating a mapping of the operational status conditions and the predetermined types of ambient lighting based upon the determined number of operational status conditions of the device and the determined number of predetermined types of ambient lighting; and generating a predetermined type of ambient lighting according to the generated mapping to indicate the current operational status of the device.

BRIEF DESCRIPTION OF DRAWINGS

For a more complete understanding of the present invention, reference is now made to the following description taken in conjunction with the accompanying drawings in which.

DETAILED DESCRIPTION OF EMBODIMENTS OF THE INVENTION

Figure 1:
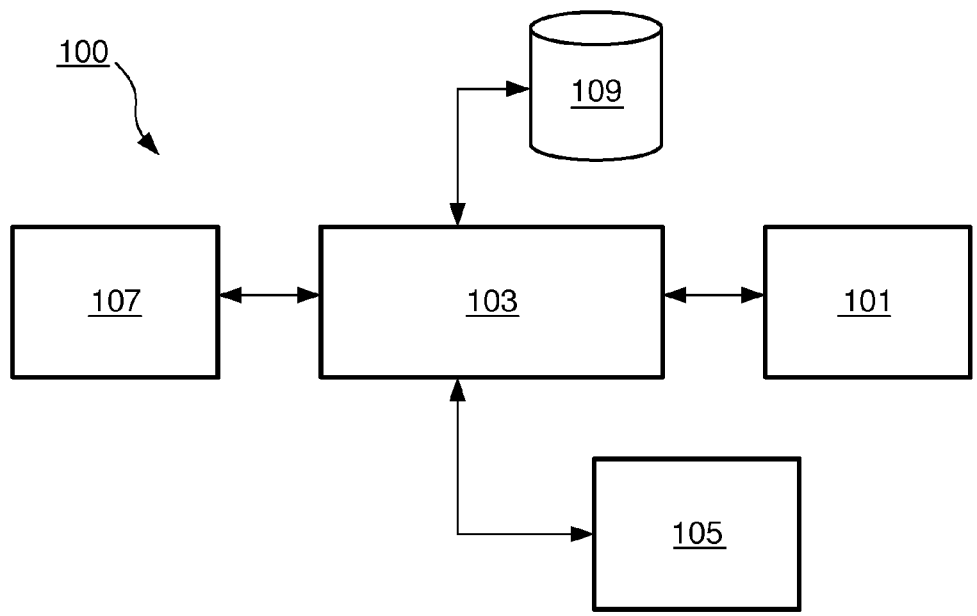
FIG. 1 is a simplified schematic of an apparatus according to an embodiment of the first invention.

With reference to FIG. 1, the apparatus 100 according to an embodiment of the present invention comprises a capturing device 101. The output of the capturing device 101 is connected to a processor 103. The processor 103 is connected to a control device or driver 105, a user interface device 107 and a storage device 109. The storage device 109 may be integral with the processor 103 or remote. The user interface device 107 may comprise a remote control device.

Operation of the apparatus will now be described with reference to FIGS. 2(*a*), 2(*b*) and 3.

A plurality of luminaries, controllable light sources are installed, step 201. The plurality of luminaries may be installed at random locations and orientations or at desired locations/orientations within a room or an outdoor area as required. These luminaries can be either RGB or white lights including Living colour lights, pixelated light, light spots and wall-washing lights or any combination thereof. The capturing device 101 of the apparatus 100 acquisitions a plurality of different combinations of illumination modes (step 203), for example, this may comprise turning each colour channel of each luminary on to its maximum intensity. The capturing device 101 acquires a separate image for each time a colour channel of a luminary is turned on. The combinations acquired may be extended to introduce differing degrees of intensity to provide additional illumination modes. Each image is then used as a "representation" of the lighting capabilities if the system, i.e. the illumination modes of the system.

In an alternative embodiment, the illumination modes may be acquisitioned by the technique disclosed in European Patent Application No. 10150849.7. As a result the different codes of each light source are used to define (acquisition) the different illumination modes.

The capturing device 101 may comprise a digital camera, for example, an omni-directional camera mounted on the ceiling or embedded in a remote-control or any other device. The capturing device 101 records the scene, preferably from the aspect of the user, for a plurality of illumination modes. The illumination modes may be acquisitioned using other sources such as other image capturing devices, videos and webcams etc. Each illumination mode comprises different lighting patterns which may generate a different mood for example dim lighting, coloured lighting. Each illumination mode is recorded and stored in a storage device 109.

Each illumination mode is then associated with at least one of a plurality of predetermined types of ambient lighting. The user using the user interface device 107 or the system can then select, step 207, the required ambient lighting and from the associated illumination mode control the illumination of the luminaries, step 209. Each illumination mode may in addition include the rendering of complex imaging to create a particular atmosphere to be associated with a predetermined type of ambient lighting.

Figure 2A:
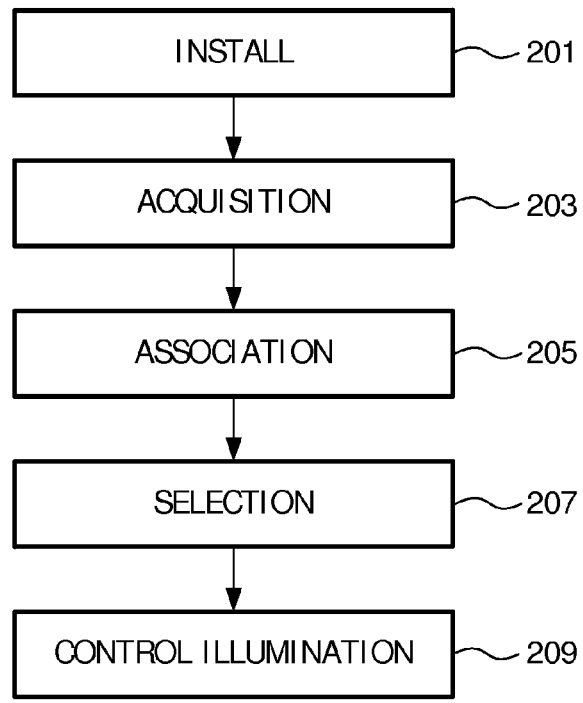
FIGS. 2(a), (b) illustrate flowcharts of the method according to alternative embodiments of the first invention.
Figure 2B:
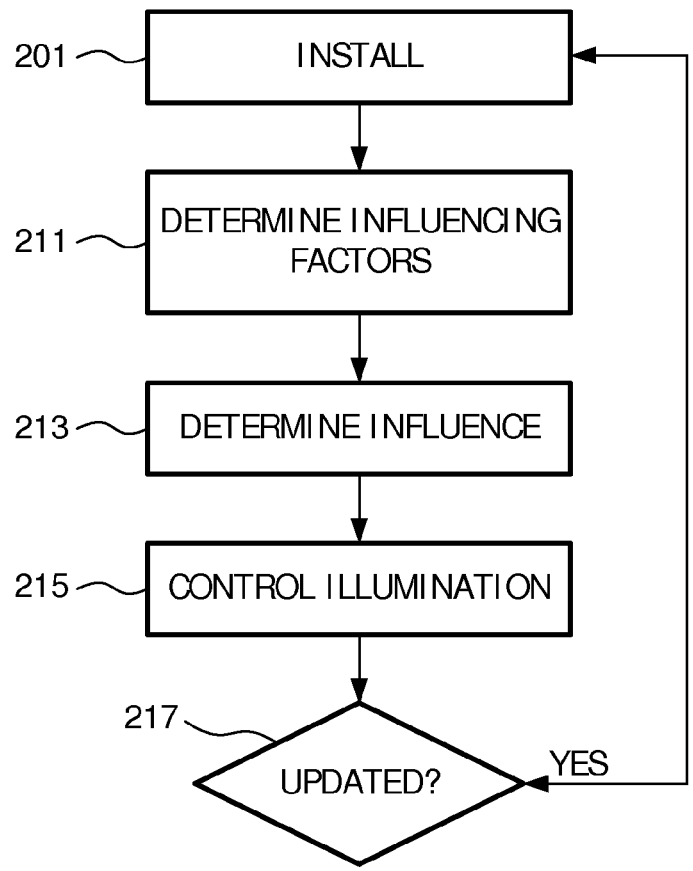

In an alternative embodiment, FIG. 2(*b*), a plurality of luminaries, controllable light sources are installed, step 201, as described above. Their location and orientation is recorded. Influencing factors such as the location and position of objects (e.g. furniture), size of the room, location of the user, shadows, influence of other lighting (for example natural lighting if outside) are measured by the capturing device 101 using position and/or motion detectors, step 211. Their influence on predetermined types of ambient light are determined based upon the location and orientation of the luminaries and the expected effect of the influencing factors, step 213, and the illumination of the luminaries is controlled, step 215 in order to generate the required ambient lighting taking the determined influences into account. The influencing factors can be monitored and if changes occur, they can be automatically updated as required, step 217, for example, an object is moved or as the user moves about the area, the illumination is adjusted accordingly.

As a result, traditional light control systems can be extended, providing an intuitive and powerful way of setting atmospheres in arbitrarily complex lighting systems. The proposed method is fast and can be implemented in real time with common hardware. Despite its simplicity, the invention is capable of reproducing rich, evocative atmospheres can be reproduced.

The user is able to create personalized atmospheres for home, retail, hospitality, museums and installations. Further, time-varying atmospheres can be created based on video clips, movies etc. This allows automatic suggestion of optimal light positions based on the desired image to be rendered or automatic selection of images or videos best fitting the actual light setting.

Furthermore, real time rendering of the atmospheres can be captured in remote locations by use of live webcam streaming or sending pictures from anywhere in the world.

The apparatus of the embodiment above (as shown in FIG. 1) may be used in conjunction with at least one controllable device providing complex continuous, visual feedback of the operating status of the device.

Figure 3:
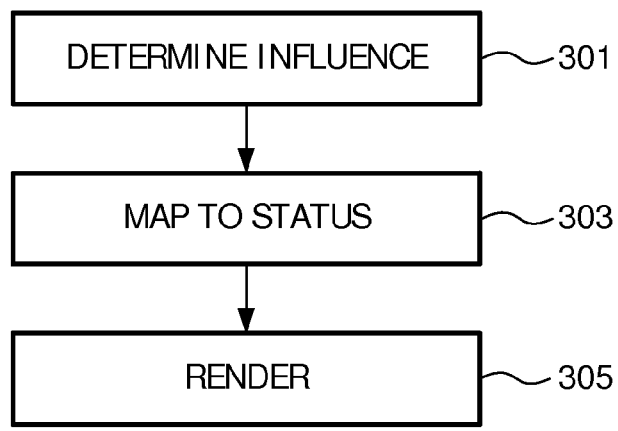
FIG. 3 illustrates a flowchart of the method according to a further embodiment of the first invention.

With reference to FIG. 3, the system automatically establishes the number and type of lights and their effect on the environment as described with reference to FIGS. 1, 2(*a*) and 2(*b*) above, step 301. These are mapped to operational status conditions of a device, step 303. The predetermined ambient lighting for a current operational status of the device is then rendered, step 305.

Figure 4:
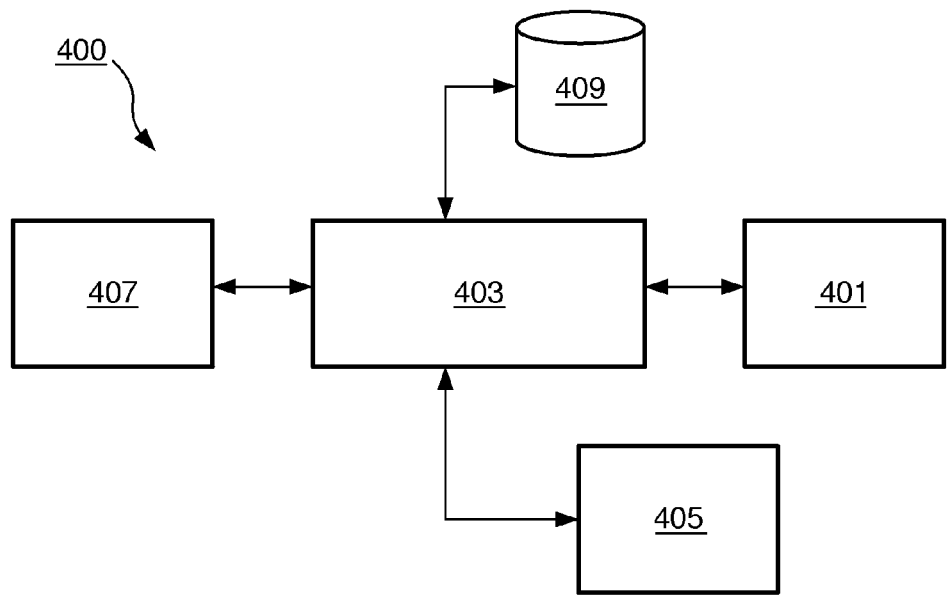
FIG. 4 is a simplified schematic of an apparatus according to an embodiment of the second invention.

According to another embodiment as shown in FIG. 4, the apparatus 400 comprises a communication device 401. The output of the capturing device 401 is connected to a processor 403. The processor 403 is connected to a control device or driver 405, a user interface device 407 and a storage device 409. The storage device 409 may be integral with the processor 403 or remote. The user interface device 407 may comprise a remote control device.

Figure 5:
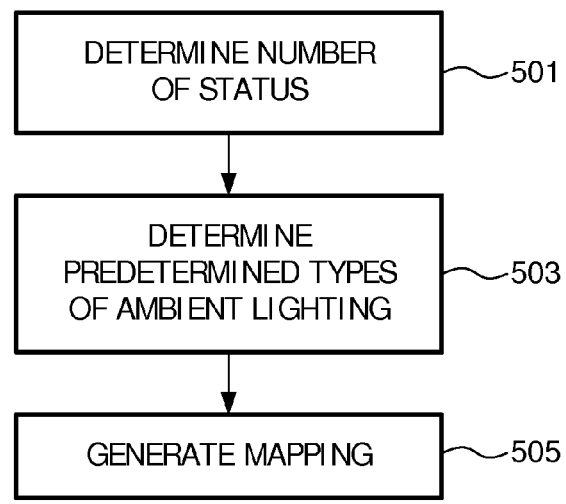
FIG. 5 illustrates a flowchart of the method according to an embodiment of the second invention.

Operation of the apparatus 400 will now be described with reference to FIG. 5.

The communication device 401 receives the variables representing the operational status of a device. The processor 403 then determines the number of status conditions of the device, step 501. The processor 403 then determines, step 503, the number (or combinations) of predetermined types of ambient lighting achievable with the light installation. This may involve using the techniques of the embodiments above. The determined number of status conditions of the device and the determined number (combinations) of predetermined types of ambient lighting are then used to generate, step 505, a mapping of the operational status conditions and the predetermined types of ambient lighting. These mappings are stored in the storage device 409. The user may adjust the mappings using the user interface 407 as required. The mapping is then used by the control device 405 to generate the corresponding ambient lighting for the current operational status of the device.

The mapping may be adapted as the number of status conditions or ambient lighting types changes.

Another example of an application of the embodiments above is use with a music player. Each predetermined type of ambient lighting may represent a music track present in the current playlist. The ambient lighting may be chosen to relate to a characteristic of the track, such as genre, cover artwork, time from last playing time, etc. The ambient lighting not only gives information on the current track, but also on the future and past songs, conveying much richer information to the user.

Continuous and diffuse feedback of the operating status of any device may be provided or feedback may be user-activated. This can be applied thus to any domestic appliance, media player, audio products etc. It can be appreciated that the more coloured lights provide in the installation, the richer the feedback information conveyed.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method of generating a predetermined type of ambient lighting comprising the steps of:
   determining an influence of each of a plurality of luminaries for a predetermined type of ambient lighting;
   controlling illumination of each of the plurality of luminaries to generate said predetermined type of ambient light based on the determined influence of each of the plurality of luminaries, and
   mapping at least one operational stat s of a device to at least one of the plurality of predetermined types of ambient lighting;
   determining a current operational status of the device; and
   applying, based on said mapping, a corresponding one of the plurality of predetermined type of ambient lighting to said device, said applied predetermined type of ambient lighting indicating said current operational status of the device.

2. The method according to claim 1, wherein the device is one of a domestic appliance, a media player and an audio product.

3. The method according to claim 1, further comprising the steps of:
   determining a combinations of a plurality of predetermined types of ambient lighting based on the plurality of luminaries;
   adapting the mapping for a plurality of operational status conditions of the device based in the determined combinations of predetermined types of ambient lighting.

4. The method according to claim 1, wherein the step of determining the influence of each of the plurality of luminaries comprises the step of:
   determining the influence of each of the plurality of luminaries on each of a plurality of predetermined types of ambient lighting.

5. The method according to claim 4, wherein the step of determining the influence of each of the plurality of luminaries on each of a plurality of predetermined types of ambient lighting comprises the step of:
   acquisitioning a plurality of illumination modes;
   associating each of the plurality of acquisitioned illumination modes with each of the plurality of predetermined types of ambient lighting.

6. The method according to claim 5, wherein the step of controlling illumination of each of the plurality of luminaries to generate said predetermined type of ambient lighting comprises the step of:
   selecting the acquisitioned illumination mode associated with the required predetermined type of ambient lighting; and
   illuminating the plurality of luminaries according to the selected acquisitioned illumination mode.

7. The method according to claim 1, wherein the step of determining the influence of each of a plurality of luminaries comprises the steps of:
   determining a plurality of influencing factors; and
   determining the influence based upon at least one of the plurality of determined influencing factors.

8. The method according to claim 7, wherein the influencing factors comprise at least one of location of each luminary, color output of each luminary, position of objects, shadows, size of room, other ambient lighting, and location of user.

9. The method according to claim 1, wherein the step of controlling illumination of each of the plurality of luminaries comprises the step of:
   controlling at least one of the color intensity output of each luminary, brightness level of each luminary, direction of illumination of each luminary, and timing of illumination of each luminary.

10. A computer program product comprising a plurality of program code portions, said program code portions controlling a processor to execute the steps of:
    determining an influence of each of a plurality of luminaries for a predetermined type of ambient lighting;
    controlling illumination of each of the plurality of luminaries to generate said predetermined type of ambient light based on the determined influence of each of the plurality luminaries, and
    mapping at least one operational status of a device to at least one of the plurality of predetermined types of ambient lighting;
    determining a current operational status of the device; and
    applying, based on said mapping, a corresponding one of the plurality of predetermined type of ambient lighting to said device, said applied predetermined type of ambient lighting indicating said current operational status of the device.

11. An apparatus for generating a predetermined type of ambient lighting, the apparatus comprising:
    a processor:
    determining the influence of each of a plurality of luminaries on a predetermined type of ambient lighting;
    controlling illumination of each of the plurality of luminaries to generate said predetermined type of ambient lighting based on the determined influence of each of the plurality of luminaries, and
    mapping at least one operational status of a device to at least one of the plurality of predetermined types of ambient lighting;
    determining a current operational status of the device; and
    applying, based on said mapping, a corresponding one of the plurality of predetermined type of ambient lighting to said device, said applied predetermined type of ambient lighting indicating said current operational status of the device.

12. The apparatus according to claim 11, wherein the device is one of a domestic appliance, a media player and an audio product.

13. The apparatus according to claim 11, further comprising:
 a capturing device acquisitioning a plurality of illumination modes of the plurality of luminaries; and
 the processor associating each of the plurality of acquisitioned illumination modes with each of a plurality of predetermined types of ambient lighting; and
 a storage device for storing the acquisitioned plurality of illumination modes.

14. A method of indicating an operational status of a device, said method comprising the steps of:
 determining a number of operational status conditions of said device;
 determining a number of predetermined types of ambient lighting of a plurality of luminaries;
 generating a mapping of the operational status conditions and the predetermined types of ambient lighting based upon the determined number of operational status conditions of the device and the determined number of predetermined types of ambient lighting; and
 generating a predetermined type of ambient lighting according to the generated mapping to indicate a current operational status of the device.

15. An apparatus for indicating an operational status of a device comprising:
 a processor:
  determining a number of operational status conditions of the device,
  determining a number of predetermined types of ambient lighting of a plurality of luminaries,
  generating a mapping of the operational status conditions and the predetermined types of ambient lighting based upon the determined number of operational status conditions of the device and the determined number of predetermined types of ambient lighting; and
 generating a predetermined type of ambient lighting according to the generated mapping to indicate a current operational status of the device.

\* \* \* \* \*